United States Patent Office 3,845,228
Patented Oct. 29, 1974

3,845,228
PROCESS FOR EXTRUDING OIL SEED
PROTEIN MATERIAL
William Thomas Atkinson, Decatur, Ill., assignor to
Archer Daniels Midland Company, Decatur, Ill.
No Drawing. Filed Mar. 27, 1973, Ser. No. 345,433
Int. Cl. A23j 3/00, 7/00
U.S. Cl. 426—364                              5 Claims

ABSTRACT OF THE DISCLOSURE

Process for preparing textured oil seed protein food products by extruding an oil seed protein material mixed with a small portion of lecithin to provide improved throughput in the extruder as well as a denser and tougher product.

THE DISCLOSURE

This invention relates to an improved process for extruding oil seed protein material to produce textured oil seed protein food products, and more particularly it relates to a process for extruding such oil seed protein material in the presence of a small amount of lecithin.

The preparation of textured food products which resemble meat is generally accomplished by extruding a mixture of soy protein material, e.g., soy bean white flakes, and water along with any suitable flavoring material and cutting the extrudate into particles of any desirable size. These particles are then dried and function as dehydrated food particles which are made edible by hydration such as that involved in any of several ordinary cooking procedures. The finished product closely resembles particles of meat in its texture, chewiness, and mouthfeel. A product of this type is described and claimed in U.S. Pat. 3,488,770 issued to William T. Atkinson, Jan. 6, 1970.

While other machines and other processes might be capable of producing a textured soy protein product of the type described above, there is none which is an convenient and as suitable as the process of extrusion accomplished by a screw extruder. Many types and designs of screw extruders can be employed to produce this product whether they have single- or multiple-flighted screws, tapered or constant root diameter, tapered or constant screw diameter, smooth or rifled barrel, or any of many other variations well-known to those skilled in the design and operation of screw extruders. Regardless of the type or design of the screw extruder, it is necessary that the machine receive a moist mixture of soy protein material at its feed end and transport that mixture in the flights of the rotating screw toward the orifice in the die at the exit end of the extruder, and while the material is being transported in this fashion it must be heated and pressurized sufficiently to cause the mixture to become a plastic mass with the protein well distributed through out that mass. As the material exits from the orifice the moisture which has been contained under the pressure inside the extruder suddenly flashes and causes an expansion in the extrudate which results in a cellular or porous product. In general these screw extruders must be designed to do a particular job including a rather narrow range of production rate. Accordingly, in order to increase the production rate it is usually necessary to add another extruder to the production line because it is impossible to achieve very much increase in production by merely speeding up the operation of the machine. It may be seen therefore that any method for increasing the production rate of such an extrusion process would be highly desirable. The process of the present invention provides a method for increasing the extrusion rate in the manufacture of textured oil seed protein materials.

It is an object of the present invention to provide an improved extrusion process for the production of textured oil seed protein food materials.

It is another object of this invention to provide a means for increasing the throughput of a screw extruder fed with a mixture of soy protein material and water.

It is another object of this invention to provide an additive which may be incorporated into the feed of a screw extruder when it is producing a textured soy protein food product.

It is still another object of this invention to provide a means for obtaining a denser and tougher textured soy protein food product resembling meat by a process which involves the extrusion of moistened soy flakes or equivalent soy protein material.

Still other objects will appear from the more detailed description of this invention which follows.

The foregoing objects are accomplished in accordance with this invention by providing a process for preparing an expanded food product by the extrusion of a mixture of solvent extracted oil seed proteinaceous material having a protein concentration of about 40% to about 80% mixed with about 20% to about 60% by weight of water, wherein the extrusion mixture additionally contains 0.1% to 2.0% of lecithin based on the dry weight of the mixture. The preferred oil seed is soy bean and the most desirable solvent extracted oil seed proteinaceous material is soy bean flakes having approximately 50% protein content. In certain preferred embodiments of this invention it is desirable to perform the extrusion on a mixture which contains about 0.2% to 0.5% lecithin.

The solvent extracted oil seed proteinaceous material which is most commonly used in the process of this invention is a commercial product prepared from soy beans. This product is operable in the process of this invention in a relatively wide range of protein content, i.e. about 40% to about 80% and this includes such commercial products as soy bean flakes, sometimes known as "white flakes" and soy bean concentrates containing about 70–80% protein. It is not intended that this invention include the extrusion of proteinaceous material which is solely protein isolate (a well-known commercial product containing 90%–100% protein). It is of course possible to mix protein isolate with non-proteinaceous materials and produce a material containing 40%–80% protein and such a mixture would be contemplated as a material which is useful in the process of this invention.

There are many other sources of protein material which are oil seed proteinaceous material and which are useful in the process of this invention. Included among these materials are peanuts, cotton seeds, sesame seeds, and the like. Furthermore, other sources of protein might be employed in minor amounts to be blended with oil seed proteinaceous material for use in the process of this invention. These would include the protein from other vegetables, fish, or animals. Preferably protein from these sources should not be present in amounts greater than about 20% of the total protein employed for reasons of economy and ease of operation.

The water content of the extrusion mix should be within the broad range of about 20%–60% of the total weight of the mixture. The optimum amount will vary with the extruder apparatus which is employed and with the temperatures and pressures of the extrusion process. In most instances the water content will vary from about 30% to about 50%. Water is necessary to produce the expanded product which has the texture, appearance and chewiness of meat. As the extrudate leaves the extruder the water which has been under a high pressure inside the extruder is suddenly released from that pressure and flashes into steam causing cells or voids to be formed so that the final product is porous in nature.

Other materials which may be present in the mix which is fed to the extruder include flavorings of various types, salts employed for seasoning, modifying the toughness of the product or for other reasons, and dyes for coloring the material. These additives are generally present in small amounts, the total of all of the additives of this type representing not more than about 5%–15% of the total extrusion mix on a dry basis.

Improvements in processing and in certain properties of the final product have been found to occur when a small amount of lecithin is also included in this extrusion mix defined above. Lecithin is a generic name for a series of mixed esters of glycerol and choline with long chain fatty acids and phosphoric acid. Two of the hydroxyl groups of glycerol are esterified with long chain fatty acids such as stearic, palmitic or oleic. The other hydroxyl group of the glycerol portion is esterified with a phosphoric acid ester of choline. The different species of lecithin vary according to the specific types of fatty acids in the ester portion of the molecule. Lecithin is a component of most living organisms and is commonly obtained as a by-product in the manufacture of soy bean oil. It is used as an edible and digestible surfactant and emulsifier in the manufacture of margarine, chocolate and other food products. Lecithin from any source and of any type is operable in the process of this invention although the preferred material is soy bean lecithin since it is the most readily available and the most economical. Corn lecithin is another preferred material because of availability and economy. Lecithin is available in several degrees of purity, in compositions ranging from about 50% to about 100% lecithin. Crude soy bean lecithin usually contains about 70% lecithin and about 30% soy bean oil, resulting in a liquid having a consistency of molasses. Pure lecithin is a waxy solid material, which is insoluble in water, will form a colloidal suspension in a sodium chloride solution, and is soluble in many organic solvents such as alcohol, ether, etc. It is of no consequence with respect to this invention whether the lecithin which is employed is in a pure solid form, mixed with soy bean oil, in a solution, or in any other form since the small amount of carrier or of solvent will not interfere with the extrusion process itself. Since crude soy bean lecithin is readily available and is the most economical source of this material it is preferred in this invention. The amount of lecithin which is employed should be from about 0.1% to about 2.0% by weight of the extrusion mixture on a dry basis. The optimum amount will vary depending upon the characteristics of the extruder and of the extrusion mix but when the extrusion mix is prepared from soy bean flakes and the extruder is a plastics extruder (as described below) it is preferable if the amount of lecithin is about 0.2% to about 0.5%.

Many types of extruders are employed in the food industry which are suitable for preparing textured protein food products. In order to produce the same product the exact proportions of components in the extrusion mix and the exact temperatures and pressures and time involved in processing this mix through the extruder may vary from one design of extruder to another. Nevertheless this process will operate with any of these extruders. For most embodiments of this invention it is preferred that the extruder be one which is sufficiently powerful and with such close fitting parts that it would be suitable for the extrusion of plastic materials such as polyolefins, elastomers, polyvinyls, etc. A typical extruder of this type is one which is commercially known as a "Prodex" extruder which may be any suitable screw diameter and capacity to match a desired production rate. Normally these extruders, by means of auxiliary heaters and the inherent friction which is developed in the process, are capable of receiving a damp extrusion mix at room temperature at the feed end of the extruder and, with a residence time of 1–2 minutes, raising the temperature of the material to 250°–400° F. and the pressure to 50–500 p.s.i. and extruding an expanded porous material. Comparison of the feed material with the extrudate indicates that the granular proteinaceous feed material has passed through a stage of being in the form of a plastic mass wherein the original physical structure of the feed material is completely converted to a fibrous, porous structure having the texture of meat (and being defined in U.S. 3,488,770 as a "plexilamellar" structure).

The process of this extrusion employing lecithin as an additive in the extrusion mix has been found to produce desirable results which are not achieved in any other known fashion. The most important result which is achieved by this additive is that it increases the throughput rates of the extruder to a remarkable extent, frequently causing the production rate to approximate 150% of the rate produced when lecithin is not included in the extrusion mix. Not only is there a remarkable increase in production rate but there are no noticeable adverse side effects accompanying this improved rate. Two properties of the product which are changed by the use of lecithin are the density and toughness of the material. The material is more dense by a factor approaching 10%. The change in toughness is not as easy to identify in numerical figures but it is a desirable change since the material which is produced in the absence of lecithin may be so frangible that when quantities of the material are shipped or otherwise moved around there is an undesirable amount of fines resulting from this treatment. When the product is made from an extrusion mix including lecithin the material is tougher and correspondingly less frangible with the result that there is a marked reduction in the amount of fines which are experienced when the product is subjected to any handling operations. Another way of describing this feature of toughness is to say that the improved material has a higher abrasion resistance. One other advantage which has been found is that the final product has a greater shelf-life because it is more resistant to oxidation which over a long period of time produces a certain amount of undesirable rancidity.

In the succeeding examples there are illustrations of various embodiments of this invention. Parts and percentages are by weight and degrees of temperature are in Fahrenheit unless otherwise specified. It is not intended that these illustrative examples shall limit the invention in any manner whatsoever.

EXAMPLE 1

The following components were mixed in a Hobart blender for a period of about 15 minutes at room temperature:

|  | Run A | Run B |
|---|---|---|
| "Kaysoy" 50A soy bean flakes*, parts | 100 | 100 |
| Water, parts | 40 | 40 |
| Crude soy bean lecithin**, parts | none | 0.5 |

*"Kaysoy" is the registered trademark of Archer Daniels Midland Company. These flakes are commercially available and similar to products of other companies generally known as "white flakes" and containing approximately 50% protein.

**This is a commercial product comprising crude lecithin extracted from soy beans and mixed with 30% by weight of soy bean oil to result in a liquid product having a viscosity similar to molasses.

The foregoing mixtures were then fed into the hopper of a "Prodex" 1¾ inch extruder equipped with a medium compression screw and an extrusion die having a square orifice ⅜ x ⅜ inch in size. The extrudate was cut into cubes by a rotating cutter as the extrudate came out of the orifice. The extruder was fitted with electric band heaters. The temperature of the plastic mass just prior to the time it leaves the orifice is measured by a thermocouple in contact with the plastic mass. This temperature was 315° F. for both runs. Both samples were run for a period of 5 minutes and the amount of extrudate collected and weighed. The runs were under identical conditions feeding the mixture through the feed hopper manually and forcing as much feed into the extruder as it would take. An ammeter measuring the amperes used by the motor driving the screw showed 7.0 amps. for Run A and 11.5 amps. for Run B.

Run A produced 2234 grams of extrudate in 5 minutes. Run B produced 3306 grams of extrudate in 5 minutes. This translates into a throughput rate of 148% based on the rate of Run A being 100%. Densities of the extrudates from the two runs were measured to be A= 21.85 lbs. per cu. ft. and B=23.97 lbs. per cu. ft. Flavor evaluations were made by a taste panel of 10 persons experienced in taste evaluations with the result that no noticeable difference in flavor between samples from the two runs was detected. Samples from each run were mixed with water sealed in tin cans and cooked for 60 minutes at 250° F. in an autoclave. The samples were then removed from the cans, cooled and subjected to a test for measuring shear value. The shear value of the sample from Run A was 40 p.s.i. and the shear value of the sample from Run B was 50 p.s.i. The shear value was the indicated texture gauge reading using the thousand pound ring of the Lee Kramer texture press Model SP-12.

This test exhibited the increase in throughput of the sample containing lecithin (Run B) as compared to the control sample without lecithin (Run A). Furthermore Run B produced a denser and tougher product than did Run A.

EXAMPLE 2

The procedure of Example 1 was repeated using the same extruder with the extrusion conditions being slightly different. The temperature of the plastic mass as measured by the thermocouple was 320° F. during the control run and 310° F. during the run of material containing lecithin. The ammeter registered 8 amps. during the control run and 11 amps. during the run of material containing lecithin. The measured throughput for the control run was 2176 grams per 5 minutes while the value was 3430 grams per 5 minutes for the run of material containing lecithin. The extrudate was subjected to an Urschel dicer to cut the material into fine particles and then dried. The recovered dried material was placed on a vibrating No. 8 U.S. Standard Screen for 15 minutes. The control sample lost 9.8 grams as fines and the sample containing lecithin lost only 4.7 grams as fines.

This example shows not only an increased throughput rate (158% of the rate of the control run) but also a substantial reduction in fines or conversely a substantial increase in toughness.

EXAMPLE 3

The procedure of Example 1 was repeated using a different commercial soy lecithin and varying the amount of lecithin from zero (control) to 0.75% based on the dry weight of soy flakes. In each instance the temperature measured by the extruder thermocouple was 310° F. The conditions and results were as follows:

|  | Percent lecithin | Ammeter reading | Throughput | |
|---|---|---|---|---|
|  |  |  | Grams per 5 min. | Percent |
| Control | 0 | 10 | 2,832 | 100 |
| Run: |  |  |  |  |
| 1 | 0.25 | 14.5 | 3,510 | 124 |
| 2 | 0.50 | 14.5 | 3,618 | 128 |
| 3 | 0.75 | 13.5 | 3,622 | 128 |

In all instances the extruded product was judged to be commercially satisfactory. The differences in throughput rates and qualities of the final product were such that no advantages could be seen when comparing Runs 1, 2 and 3 with each other.

EXAMPLE 4

The procedure of Example 1 was repeated comparing the use of corn lecithin with soy lecithin at the concentration of 0.3% lecithin based on the dry weight of soy flakes. The throughput rates were such that the run employing soy lecithin exhibited a rate of 128% and the run employing corn lecithin exhibited a rate of 134% compared to a control run (no lecithin) at 100%. The difference between 128% and 134% is considered to be insignificant.

Although the invention has been described in considerable detail with reference to certain preferred embodiments thereof it will be understood that variations and modifications can be effected within the spirit and scope of the invention as described hereinabove and as defined in the appended claims.

What is claimed is:

1. In the process for preparing an expanded food product by the extrusion of a mixture of solvent extracted oil seed proteinaceous material having a protein concentration of about 40% to about 80% mixed with about 20% to about 60% by weight of water the improvement which comprises extruding such a mixture which additionally contains 0.1% to 2.0% of lecithin based on the dry weight of said mixture.

2. The process of Claim 1 wherein said lecithin is crude soy bean lecithin comprising approximately 70% lecithin and 30% soy bean oil.

3. The process of Claim 1 wherein said oil seed is soy bean.

4. The process of Claim 3 wherein said solvent extracted soy bean proteinaceous material is soy bean flakes having approximately 50% protein content.

5. The process of Claim 1 wherein said lecithin is present in the amount of 0.2% to 0.5%.

References Cited
UNITED STATES PATENTS

| 3,488,770 | 1/1970 | Atkinson | 99—17 |
| 3,537,859 | 11/1970 | Hamdy | 426—364 X |
| 3,684,521 | 8/1972 | Glicksman et al. | 426—364 X |

JAMES R. HOFFMAN, Primary Examiner

U.S. Cl. X.R.

426—104, 802